United States Patent [19]
Damsohn et al.

[11] Patent Number: 5,665,261
[45] Date of Patent: Sep. 9, 1997

[54] MOTOR VEHICLE ELECTRIC HEATING DEVICE HAVING ANGLED OFF METAL HEATING PLATES ARRANGED TO MUTUALLY ABUT ONE ANOTHER AT OPPOSITE ENDS

[75] Inventors: Herbert Damsohn, Aichwald; Karl-Gerd Krumbach, Burgstetten; Michael Loehle, Esslingen; Eberhard Zwittig, Hochdorf, all of Germany

[73] Assignee: Behr GmbH & Co., Stuttgart, Germany

[21] Appl. No.: 531,769

[22] Filed: Sep. 21, 1995

[30] Foreign Application Priority Data

Sep. 28, 1994 [DE] Germany .................. 44 34 613.1

[51] Int. Cl.⁶ ................ B60L 1/02; H05B 3/06
[52] U.S. Cl. ............ 219/504; 219/202; 219/530; 219/532; 219/540; 392/360; 338/51
[58] Field of Search .................. 219/202, 504, 219/505, 530, 532, 540; 392/347, 360, 365–369, 379, 473, 383–385, 480, 502, 373, 482; 338/51, 221, 252

[56] References Cited

U.S. PATENT DOCUMENTS

| | | | |
|---|---|---|---|
| 4,931,626 | 6/1990 | Shikama et al. | 219/540 |
| 4,939,349 | 7/1990 | Liu | 219/504 |
| 4,990,748 | 2/1991 | Starck | 219/504 |
| 5,057,672 | 10/1991 | Bohlender et al. | 219/540 |
| 5,192,853 | 3/1993 | Yeh | 219/540 |
| 5,239,163 | 8/1993 | Brouwers | 219/202 |
| 5,256,857 | 10/1993 | Curhan et al. | 219/202 |
| 5,326,418 | 7/1994 | Yeh | 156/291 |
| 5,377,298 | 12/1994 | Yang | 392/360 |
| 5,471,034 | 11/1995 | Kawate et al. | 219/530 |

FOREIGN PATENT DOCUMENTS

| | | |
|---|---|---|
| 0 243 077 | 10/1987 | European Pat. Off. . |
| 0 333 906 | 9/1989 | European Pat. Off. . |
| 0 350 528 | 1/1990 | European Pat. Off. . |
| 0 616 486 | 9/1994 | European Pat. Off. . |
| 3 425 208 | 1/1986 | Germany . |
| 3 907 655 | 10/1989 | Germany . |
| 4 404 345 | 8/1994 | Germany . |

OTHER PUBLICATIONS

Burk et al., "Integral Air–Conditioning System for Electric Cars", ATZ Autombiltechnische Zeitschrift, Issue 22, pp. 2–8, 1992.

Primary Examiner—Teresa J. Walberg
Assistant Examiner—Raphael Valencia
Attorney, Agent, or Firm—Foley & Lardner

[57] ABSTRACT

An electric heating device includes a plurality of heating elements which are assembled to form a block. Such a heating element is formed from two metal plates, with the interposition of PTC elements. In order to increase the heat transfer, the metal plates are provided with corrugation ribs. Each heating element includes a pair of metal plates which are angled off essentially in the form of an L such that the angled-off sections are connected in a frictionally locking manner to each other. The angled-off sections are arranged at opposite ends of the heating elements and angled in opposite directions, the length of the angled-off sections of the metal plates being dimensioned such that angled-off sections of one pair of metal plates are in mutual abutment with angled-off sections of respectively adjacent pairs of metal plates.

20 Claims, 3 Drawing Sheets

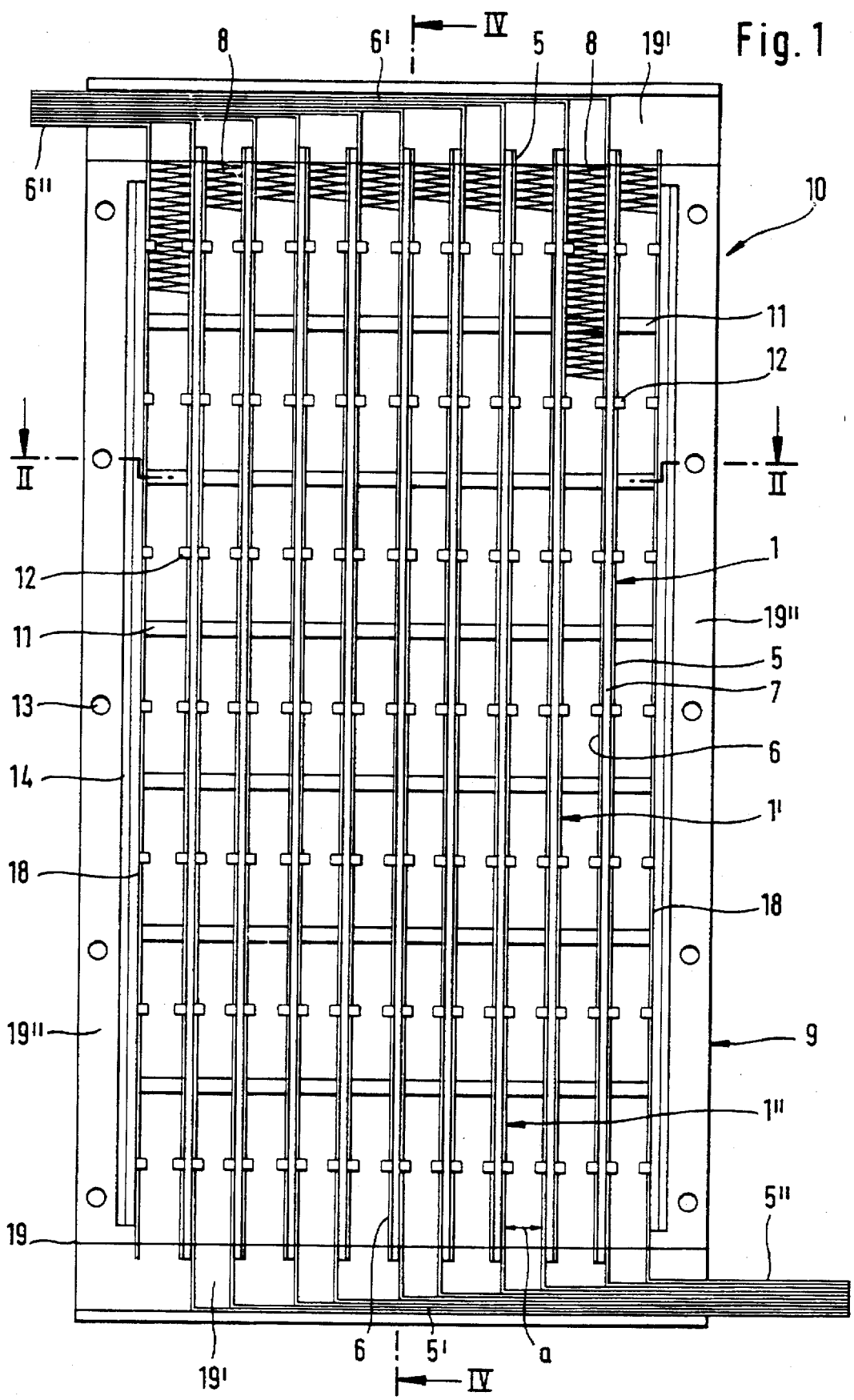

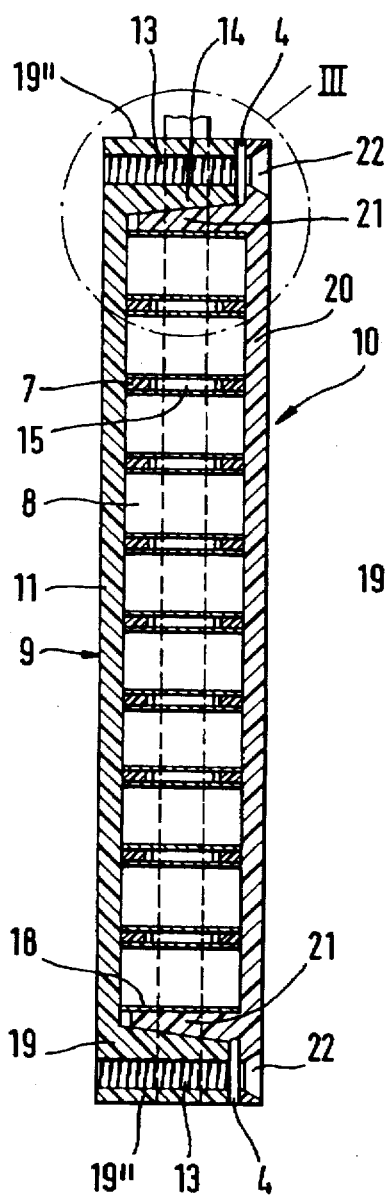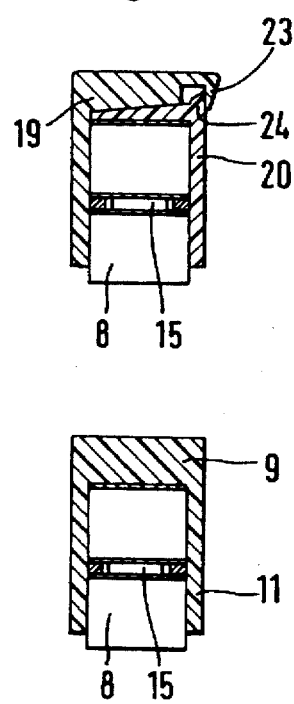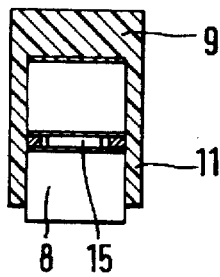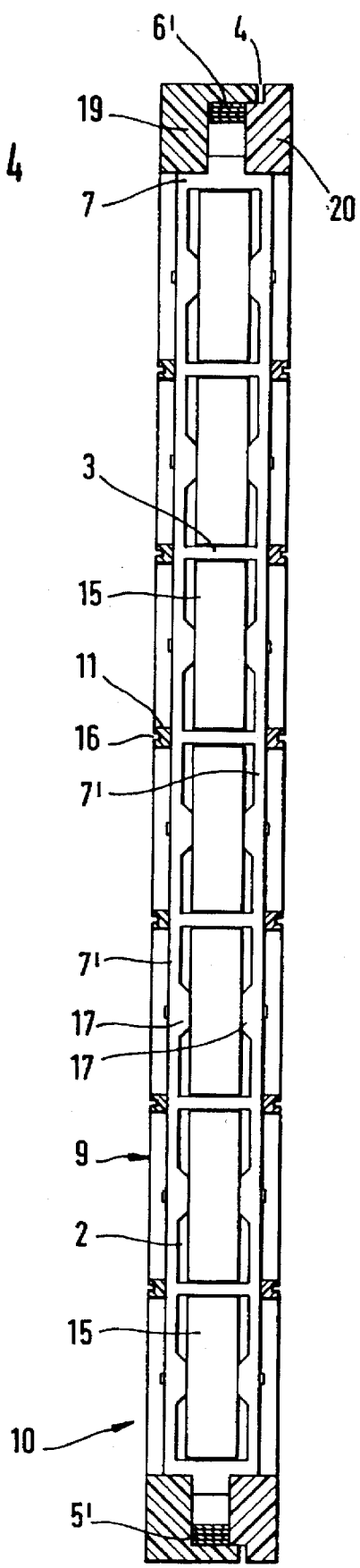

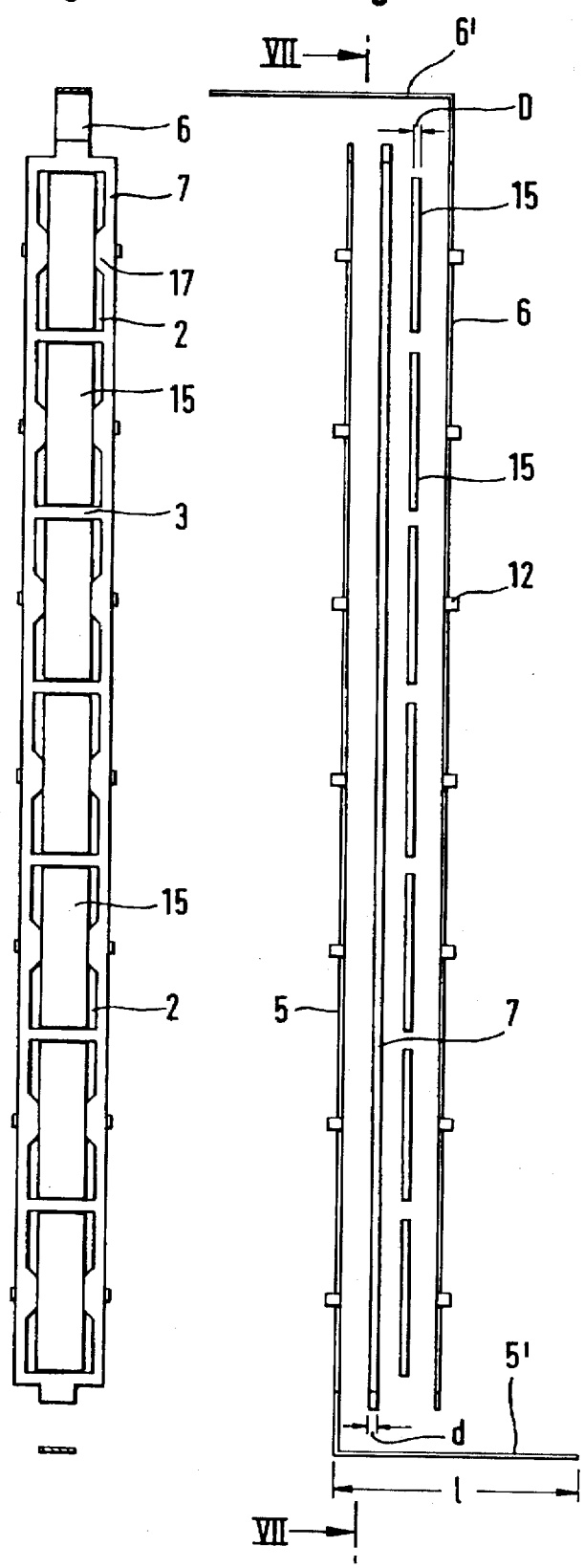
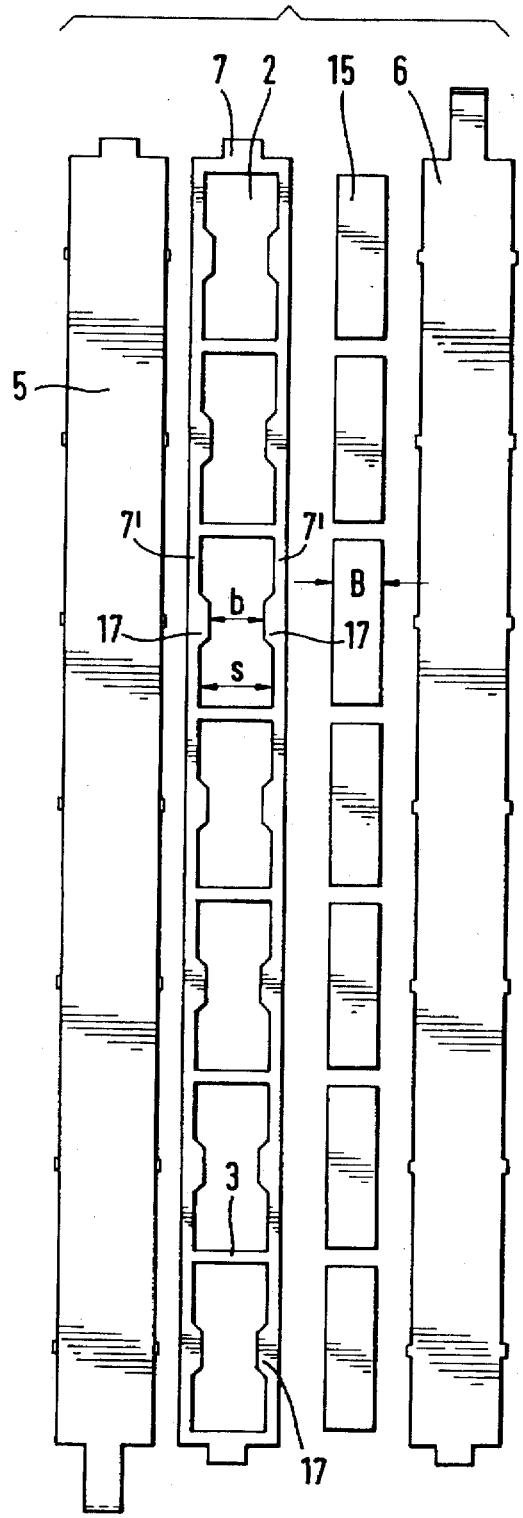
Fig. 7 Fig. 5 Fig. 6

MOTOR VEHICLE ELECTRIC HEATING DEVICE HAVING ANGLED OFF METAL HEATING PLATES ARRANGED TO MUTUALLY ABUT ONE ANOTHER AT OPPOSITE ENDS

BACKGROUND OF THE INVENTION

1. Field of the Invention

The invention relates to an electric heating device, in particular to an electric heating device for a motor vehicle.

2. Description of the Related Art

The interior of a motor vehicle is usually heated by means of the cooling water of the vehicle drive unit. The heat which is generated by the internal combustion engine and discharged to the cooling water is subsequently released, upon request, to the air flowing into the vehicle interior. However, this heat is only available after a certain period of operation of the motor vehicle, such that during colder days, the responsiveness of the heating system is inadequate. Especially with the development of new engines which generate less heat energy to be dissipated via the cooling water, a smaller amount of heat energy is available for heating the vehicle. As a result, the amount of heat energy is in no way sufficient for heating the vehicle in the event of extremely low outside temperatures. Even for normal heating, the heating system provides comfortable interior temperatures only after a considerable time delay.

For the above reasons, additional heating systems have already been proposed. These systems are introduced into the air-channeling ducts to discharge heat to the air flowing into the vehicle interior. The arrangement of an additional heating system between a heat exchanger of a vehicle heating system and the vehicle compartment is described, for example, in the essay written by Burk, Kraus, Löble "Integrales Klimasystem für Elektroautomobile" [Integral air-conditioning system for electric vehicles] ATZ Autombiltechnische Zeitschrift, Issue 11, 1992.

EP-A-A 0 243 077 discloses an additional electric heating system for a motor vehicle, in the case of which, PTC (Positive Temperature Coefficient) elements are in heat-conductive connection with corrugation ribs, and the heat generated by the PTC elements is discharged via the corrugation ribs to the air flowing through an air-channeling duct. The entire arrangement comprises two metal plates, the PTC elements between them, and corrugation ribs arranged on the other side of the metal plate, and has a thin insulation material wrapped around it. The insulation material simultaneously forms the air-channeling duct. Due to the cross section available, only a low heating output can be transferred in the case of such an arrangement, so that the requirements concerning safety (defrosting of the windscreen) and comfort are not realized.

In addition, EP-B-0 350 528 discloses a radiator which comprises a plurality of heating elements which are arranged in parallel, are assembled to form a block and are fastened in a frame. PTC elements are retained between two metal plates. Located respectively on the other side of the metal plates is a corrugation rib which is in heat-conductive connection with the metal plates.

In this arrangement, each heating element is provided with an electrical connection which is guided through a frame part to the outer side of the radiator. For radiators with a greater heating output and which thus require a greater number of heating elements, the number of necessary electrical connections and the requisite insulations in the region of the lead-throughs is also multiplied. Since the corrugation rib is connected integrally to the metal plates adjacent thereto, the heating elements cannot be prefabricated since they are formed only when the entire radiator has been produced, and only by inserting the PTC elements between the metal plates provided with corrugation ribs. It is thus only possible to check the heating element when the radiator is completed. In other words, the entire radiator has to be removed if there is a fault in a heating element.

SUMMARY OF THE INVENTION

The object of the invention is to provide an electric heating device of a simpler and a more cost-effective construction.

This and other objects are accomplished with an electric heating device for a motor vehicle having a frame and a plurality of heating elements assembled to form a block and fastened to the frame. The heating elements are arranged in parallel and each heating element is formed from two metal plates and PTC elements disposed between the two metal plates. Corrugation ribs which are in heat-conductive connection with the metal plates are also provided.

In the heating device, the metal plates include angled-off sections essentially in a form of an L. The angled-off sections are connected to each other in a frictionally locking manner. The angled-off sections of the metal plates are arranged at opposite ends of the heating element and are angled in opposite directions. The length (l) of the angled-off sections of the metal plates are dimensioned such that angled-off sections of one pair of metal plates are in mutual abutment with angled-off sections of respectively adjacent pairs of metal plates.

An important advantage of the invention consists in the fact that the heating element can be produced as a standardized, prefabricated component and its functional capacity can be checked. Any number of these components can be assembled in accordance with the heating output required, and the angled-off section forming a common electrical connection on the respective side of the heating device.

According to another preferred embodiment of the invention, the length of the angled-off section is at least double the distance between the heating elements. This provides a sufficiently large abutment surface and good current transfer. A configuration in which the ends of the angled-off sections of one side of each heating element project in a clustered formation through a lateral opening of the frame is particularly advantageous. This achieves, depending on the number of joined-together heating elements of the block, a corresponding cross section of the electrical connection. As a result, the current-carrying capacity of the individual current-carrying metal plates is always the same and temperature peaks are thus avoided. These clustered ends of the angled-off section are expediently designed as a plug-in or screw contact for an electrical connection lead. In order to secure the corrugation ribs in their position between the respective metal plates, even without integral connection, a plurality of protrusions are provided on the metal plates along their surface to serve as abutment for the corrugation ribs.

In order to avoid the risk of short circuits of the electrically conductive metal plates and corrugation ribs and also to provide good electric and thermal insulation with respect to the outside, it is preferable for the frame to consist of a plastic and to enclose the outer peripheral surface of the block. The frame has a U-shaped cross section on its end sides, where it receives the ends of the heating elements. As long as no provision is made for repairing the heating device in the event of a subsequently occurring defect in one of the heating elements, the frame may be produced in one piece and by encapsulating the block. To make subsequent demounting possible, the frame may comprise two frame parts which are connected releasably to one another, e.g., screwed or clipped. To assure that the heat-conductive parts of the block are in good heat-conductive connection, means for clamping the block are provided on at least one of the frame parts. The clamping means is preferably configured as wedges which can be displaced with respect to one another and may be formed integrally on the frame part or otherwise configured as an insert part.

A particularly simple assembly of the block of the heating device is possible if the heating elements can be inserted into one of the frame parts, followed by the interposition of the corrugation ribs and the mounting of the other frame part. For this purpose, it is expedient that the separating plane of the two frame parts runs along the peripheral border. Alternatively, however, it may also be provided that the separating plane of the two frame parts is arranged in the region of the frame end sides which engage around the angled-off sections, and two identical frame parts are joined together in a mirror-symmetrical manner. Since a standardized frame part is thus fused, the variety of parts and the risk of errors when mounting are reduced. In order to increase the mechanical strength of the heating device and as means for protecting the electrically conductive parts against contacts with further elements of a vehicle heating or airconditioning system which are located in the vicinity of the heating device, it is proposed that at least one web be provided within the surface area enclosed by the frame. The webs extend between two sides of the frame and is preferably configured in one piece with one of the frame parts. In this arrangement, it is particularly expedient that webs span the surface area in a grid-like manner.

The heating elements are preferably constructed such that a sealing frame which encloses the PTC elements is arranged between the metal plates, the thickness of which sealing frame is preferably slightly greater than the thickness of the PTC elements. For this purpose, the material of the sealing frame should be such that it is compressed to the dimension of the PTC elements even when a low pressure is exerted on it, with the result that there is satisfactory contact between the PTC elements and the metal plates. Such a sealing frame ensures that the PTC elements cannot fall out between the metal plates and, moreover, prevents the penetration of dirt or moisture, which could lead to a short circuit between the metal plates, which are at different potentials, or even to corrosion. In order to assure that the PTC elements maintain their defined position evenly in the longitudinal direction of the metal plate, the sealing frame has arms which run transversely with respect to its longitudinal sides and are located between adjacent PTC elements. The sealing frame is expediently connected to the two metal plates by means of an adhesive, with the inclusion of the PTC elements. In order to assure that the adhesive is located only at the points at which the sealing frame comes into abutment with the metal plates and that those surfaces of the PTC elements against which the metal plates butt are reliably kept free of adhesive, it is expedient to apply the adhesive by screen printing.

In order also to compensate for heat expansion of the heating elements after the adhesive bonding, the material of the sealing frame and of the adhesives should have sufficient elastic properties. For this reason, it is expedient to produce the sealing frame from silicone and likewise to use a silicone material as adhesive. Since dimensional deviations within a certain tolerance range cannot be avoided in the production of PTC elements, the width of the openings in the sealing frame, and thus the distance between the two longitudinal sides, is provided to be greater than the width of the PTC elements. This means that tensile stresses in the material of the sealing frame are avoided. Nevertheless, in order to assure that the PTC elements also maintain a defined position in the direction between the two longitudinal sides, inwardly directed protrusions are arranged along the longitudinal sides of the sealing frame, and the front edges of which protrusions correspond to a distance which is equal to the width of the PTC elements. The distance between the protrusions is appropriate with respect to dimensional deviations in the width of the PTC elements.

Additional objects and advantages of the invention will be set forth in the description which follows. The objects and advantages of the invention may be realized and obtained by means of the instrumentalities and combinations particularly pointed out in the appended claims.

BRIEF DESCRIPTION OF THE DRAWINGS

Exemplary embodiments of the heating device according to the invention are explained in more detail hereinbelow with reference to the drawing, in which:

FIG. 1 shows a heating device formed from a plurality of heating elements which are inserted in a frame part;

FIG. 2 shows a section view taken along line II—II in FIG. 1;

FIGS. 3a and 3b show variants of the frame cross section;

FIG. 4 shows a section view taken along line IV—IV in FIG. 1;

FIG. 5 shows an exploded representation of a single heating element;

FIG. 6 shows a front view of all the individual parts in FIG. 5; and

FIG. 7 shows a section view taken along arrows VII, VII in FIG. 5.

DETAILED DESCRIPTION OF THE PREFERRED EMBODIMENTS

FIGS. 1, 2 and 4 show a heating device 10 which comprises a plurality of heating elements 1, 1', 1", received in a frame 9, and corrugation ribs 8 arranged between the heating elements. The heating elements 1, 1', 1" comprise two mutually parallel metal plates 5 and 6, between which there are provided a plurality of PTC elements 15, e.g., thermistors having positive temperature coefficients, in a sealing frame 7. The metal plates 5 and 6 of each heating element 1, 1', 1" have a section 5' and 6', respectively, which is bent off at right angles, such that the metal plates 5 and 6 are essentially in the form of an L. As a result of the angled-off sections 5' and 6' which are oriented in opposite directions, the heating elements 1, 1', 1" are in the form of a Z. In accordance with the representation in FIG. 1, the heating elements 1, 1', 1" are inserted into a frame part 19 of the frame 9 such that all the angled-off sections 5' are located on the lower end side 19' and all the angled-off sections 6' are located on the upper end side 19'. The angled-off section 5' and 6' are sufficiently long to span the distance a between two adjacent heating elements and to extend along the angled-off section 5' and 6' of the other heating elements 1, 1', 1". The end sides 5" and 6" are lead to the outside through a lateral opening in the ends 19'.

Along the surfaces against which the corrugation ribs 8 rest, the metal plates 5 and 6 are provided with protrusions 12 which serve to secure the position of the corrugation ribs 8 between the heating elements 1, 1', 1".

Webs 11, which are configured in one piece with the frame parts, extend between the longitudinal sides 19" of the frame parts 19 and 20 (see FIG. 2). The webs 11 serve to increase the strength of the heating device and also provide protection against contact with metallic components arranged in the vicinity. As can be seen from FIG. 2, threaded bores 13 are arranged in the frame part 19, on the longitudinal sides 19" thereof, and the frame part 20 has coinciding countersinking holes 22, such that the two frame parts can be connected releasably to one another by means of screws. In order to assure that the corrugation ribs 8 are in reliable heat-conductive connection with the metal plates 5 and 6, the block is clamped when the frame parts 19 and 20 are joined together. This clamping takes place with the aid of wedges 14 and 21, which are each integrally formed on the frame parts 19 and 20. A separating plane 4 between the frame parts 19 and 20 can be seen, from FIGS. 2 and 4, as the joint between the two parts.

According to the representation in FIG. 1, the respectively outer corrugation ribs 8 are located on a metal termination plate 18, which is likewist configured as an angled-off metal plate. This has the advantage that, when the block for the heating device is assembled, the metal plate 18 does not have to undergo extra alignment with respect to its longitudinal axis, but is held in its defined position by the angled-off faction.

Moreover, it can be seen from FIG. 4 that the sealing frame 7 extends with its longitudinal side 7' along the border of the metal plates 5. PTC elements are located within the sealing frame 7, which preferably consists of silicone. Between two adjacent PTC elements 15, arms 3 of the sealing frame 7 extend between the longitudinal sides 7', such that an opening 2 is formed for each PTC element 15 in the sealing frame 7. In order to compensate for the dimensional deviations of the PTC elements, and to assure that they fit readily into the openings 2 upon production of the heating elements, the dimension of the openings 2 is greater than that of the PTC elements 15, the distance between the longitudinal side 7' being designated by s. Otherwise, the sealing frame would be subjected to tensile stressing and the electrical contact with the metal plates would not be ensured. Nevertheless, to achieve a central positioning of the PTC element 15 within each opening 2 between the longitudinal sides 7', the sealing frame 7 has inwardly directed protrusions 17 on its longitudinal sides 7'. The protrusions are located opposite one another and are spaced apart from one another by a distance b which corresponds to the width B of the PTC elements 15. As can further be seen from FIG. 4, the webs 11 are provided with grooves 16 which serve to receive clamping wires.

In order to mount the heating device 10 described in FIGS. 1, 2 and 4, the prefabricated heating elements 1, 1', 1", etc. are inserted into the lower frame part 19, with the interposition of corrugation ribs 8. A metal termination plate 18 forms the lateral border of the block in each case. The angled-off section 5' and 6' of the Z-shaped heating elements 1, 1', 1" form a common current supply, and an electric connection cable can be fastened at their ends 5" and 6" located outside the frame 9. As soon as the block is fully inserted into the frame part 19, the other frame part 20 is positioned thereon, with the result that the oblique surfaces of the wedges 14 and 21 are located one against the other. The action of screwing fastening screws into the threaded bores 13 then effects clamping of the block transversely with respect to the longitudinal direction of the heating elements 1, 1', 1". The corrugation ribs 8, due to their shape, adjusts accordingly as the entire block settles, and thus comes into secure abutment against the metal plates 5 and 6.

FIG. 3a shows that, in order to connect the frame parts 19 and 20, provision may be made for a snap-type connection, which is formed by a resilient clip 23 which engages behind a protrusion 24 of the frame part 20. A plurality of resilient clips 23 should be distributed over the entire periphery of the frame 9.

FIG. 3b shows an alternative configuration, in the case of which the frame 9 does not have a separating plane running along the peripheral border, but instead engages around the border of the block.

FIG. 5 shows an exploded representation of the constituent parts of a heating element in the previously described figures. As can be seen therefrom, the heating element comprises a first metal plate 5 with an angled-off section 5' and a second metal plate 6 with an angled-off section 6'. The angled-off section 5' and 6' are of a length 1 which is considerably greater than the previously described distance a by which the heating elements are spaced apart from one another once they have been assembled to form a block. Along their surface which serves for the abutment of the corrugation ribs, the plates 5 and 6 have protrusions 12 in the form of bent-over metal-plate lugs. When the heating element is produced, the metal plates 5 and 6 enclose the PTC elements 15 and its sealing frame 7 between them. In this arrangement, the thickness d of the sealing frame 7 is slightly greater than the thickness D of the PTC elements 15, for example d=1.45 mm and D=1.4 mm.

In order to join the individual parts of the heating element together and to connect them fixedly, the surfaces of the metal plates 5 and 6 are provided with a silicone-based adhesive corresponding to the shape of the sealing frame 7, the adhesive preferably being applied by screen printing. This ensures that the abutment surfaces for the PTC elements 15 remain free of adhesives, with the result that the electric and thermal contact between the metal plates and the PTC elements is ensured. The sealing frame 7 is then positioned on one of the two metal plates, so that the sealing frame 7 is not pressed on. The PTC elements 15 are then inserted into the openings 2. Since the openings 2 between the longitudinal sides 7' have a greater distance s than the width B of the PTC elements 15, mutually opposite protrusions 17 are provided on the longitudinal side 7' for precise positioning of the PTC elements, the distance b between which protrusions corresponds to the width B of the PTC elements. As seen in the longitudinal direction of the heating element, the PTC elements 15 are spaced apart and positioned by transversely running arms 3 of the sealing frame 7.

As soon as the PTC elements 15 have been inserted into the openings 2 of the sealing frame 7, the second metal plate is positioned thereon and the parts are then pressed against one another at a suitable pressure, this resulting in a frictionally locking connection of the metal plates 5 and 6 via the sealing frame 7. FIG. 7 shows a section along line VII—VII in FIG. 5, the representation corresponding to the stage, in the production of the heating element, before the second metal plate is positioned.

It is also possible to arrange the Z-shaped heating elements in the form of a parallelogram in a corresponding frame, this resulting in a uniform distance of the respective angled-off section 5' and 6' from the end of the sealing frame 7. This permits the use of fully identical heating elements 1 and the metal plates 5 and 6 thereof. The same aim is achieved if the angle between the metal plate 5 and 6 and the section 5' and 6' is somewhat smaller than 90°, with the result that the sections 5', 6' run at a slight angle in the end sides 19' of the frame 9 and of the frame part 19, 20.

While particular embodiments according to the invention have been illustrated and described above, it will be clear that the invention can take a variety of forms and embodiments within the scope of the appended claims.

What is claimed is:

1. An electric heating device for a motor vehicle, comprising:

a frame;

a plurality of parallel heating elements assembled to form a block and fastened to said frame, each of said heating elements being formed from a pair of metal plates and a PTC element disposed between said metal plates; and corrugation ribs in heat-conductive connection with the metal plates, wherein said metal plates include angled-off sections, essentially in a form of an L, connected to each other in a frictionally locking manner, and wherein said angled-off sections of said metal plates are arranged at opposite ends of said heating elements and are angled in opposite directions, a length (l) of said angled-off sections of said metal plates being dimensioned such that angled-off sections of one pair of metal plates are in mutual abutment with angled-off sections of respectively adjacent pairs of metal plates.

2. An electric heating device as claimed in claim 1, wherein the length (l) of the angled-off sections is at least double a distance (a) between the heating elements.

3. An electric heating device as claimed in claim 2, wherein ends of the angled-off sections of one side of each heating element project in a clustered formation through a lateral opening of the frame.

4. An electric heating device as claimed in claim 3, wherein each of the metal plates has a plurality of protrusions along a surface thereof to serve as an abutment for the corrugation ribs.

5. An electric heating device as claimed in claim 1, wherein the frame is plastic and encloses the outer peripheral surface of the block, the frame having a U-shaped cross section at end sides thereof to receive respective ends of the heating elements.

6. An electric heating device as claimed in claim 5, wherein the frame is produced in one piece and by encapsulating the block.

7. An electric heating device as claimed in claim 5, wherein the frame comprises two frame parts and wherein means for clamping the block are provided on at least one of the frame parts.

8. An electric heating device as claimed in claim 7, wherein the clamping means are configured as wedges displaced with respect to one another.

9. An electric heating device as claimed in claim 7, wherein a separation plane of the two frame parts runs along the peripheral surface.

10. An electric heating device as claimed in claim 7, wherein the separation plane of the frame parts is provided at the end sides of the frame to engage around the angled-off sections and wherein two identical frame parts are joined together in a mirror-symmetrical manner.

11. An electric heating device as claimed in claim 7, wherein threaded bores are provided on sides running parallel to the direction of the heating elements of one frame part and coinciding countersinking holes are provided in the other frame part so that the frame parts are screwed to one another.

12. An electric heating device as claimed in claim 7, wherein the frame parts are connected releasably to one another through a plurality of resilient clips arranged on one frame part and a protrusion on the other frame part.

13. An electric heating device as claimed in claim 12, wherein at least one web is provided within the surface area enclosed by the frame, said web extending between two sides of the frame and being configured integrally with one of the frame parts.

14. An electric heating device as claimed in claim 12, wherein a sealing frame encloses the PTC elements and is arranged between the metal plates, a thickness (d) of said sealing frame being slightly greater than a thickness (D) of the PTC elements.

15. An electric heating device as claimed in claim 14, wherein the sealing frame has arms which run transversely with respect to its longitudinal sides and which are located between adjacent PTC elements.

16. An electric heating device as claimed in claim 14, wherein a distance (s) between the two longitudinal sides of the sealing frame is greater than a width (B) of the PTC elements.

17. An electric heating device as claimed in claim 16, wherein inwardly directed protrusions are arranged along the longitudinal sides, front edges of said protrusions corresponding to a distance (b) which is equal to the width (B) of the PTC elements.

18. An electric heating device, comprising:

a frame;

a plurality of parallel metal plates fastened to said frame and arranged in pairs, wherein each pair has a first parallel metal plate which includes an angled-off section at a first end and a second parallel metal plate which includes an angled-off section at a second end which is opposite to the first end; and a heating element disposed between each pair of the parallel metal plates, wherein the angled-off sections at the first ends are angled in a first direction and are configured to be in mutual abutment with one another, and wherein the angled-off sections of the second ends are angled in a second direction and are configured to be in mutual abutment with one another.

19. An electric heating device as claimed in claim 18, wherein the angled-off sections are essentially L-shaped.

20. An electric heating device as claimed in claim 19, wherein said second direction is opposite to said first direction.

* * * * *